United States Patent [19]
Hoogenboom

[11] Patent Number: 6,094,430
[45] Date of Patent: Jul. 25, 2000

[54] SWITCHING FABRIC FOR A DIGITAL TRAFFIC SWITCH

[75] Inventor: Christopher L. Hoogenboom, Calabasas, Calif.

[73] Assignee: Xylan Corporation, Calabasas, Calif.

[21] Appl. No.: 08/936,673

[22] Filed: Sep. 24, 1997

[51] Int. Cl.[7] .................................................. H04L 12/54
[52] U.S. Cl. ........................ 370/375; 370/413; 370/429; 370/458
[58] Field of Search .................... 370/357, 359, 370/360, 395, 412, 413, 414, 415, 416, 417, 418, 419, 422, 423, 427, 428, 429, 458, 498, 375, 376, 377, 378, 379, 466

[56] References Cited

U.S. PATENT DOCUMENTS

| | | | |
|---|---|---|---|
| 4,922,488 | 5/1990 | Niestegge ................................ | 370/413 |
| 4,947,387 | 8/1990 | deceased et al. ...................... | 370/416 |
| 5,081,622 | 1/1992 | Nessehi .................................. | 370/440 |
| 5,126,999 | 6/1992 | Munter et al. ......................... | 370/415 |
| 5,146,455 | 9/1992 | Goke et al. ............................ | 370/376 |
| 5,168,492 | 12/1992 | Beshai et al. ......................... | 370/353 |
| 5,241,536 | 8/1993 | Grimble et al. ....................... | 370/398 |
| 5,383,182 | 1/1995 | Therasse et al. ...................... | 370/394 |
| 5,459,724 | 10/1995 | Jeffrey et al. ......................... | 370/398 |
| 5,577,035 | 11/1996 | Hayter et al. ......................... | 370/395 |

*Primary Examiner*—Chi H. Pham
*Assistant Examiner*—Kwang B. Yao
*Attorney, Agent, or Firm*—Scot A. Reader

[57] ABSTRACT

A switching fabric for a high-speed, high-performance digital traffic switch guarantees a high degree of resource availability and is resource efficient. Each input port associated with the switching fabric is assigned a time slot in a repetitive time cycle. Data cells received on input ports are staggered so that they are transmitted through the switching fabric in conformance with the assigned time slots. The time slot arrangement allows small data units associated with a particular cell, as they are forwarded through the switching fabric, to be converted into larger parallel data units which respect cell boundaries. The time slot arrangement further allows several of such larger data units to be written into an output queue in a single clock cycle. Thus, cell contention is avoided while making efficient use of queue space. Cells destined for multiple output ports associated with the switching fabric are written into the fullest output queue associated with one of the destination ports, so that the cell can be read and transmitted to all destination output ports using pointers, without the need to replicate the cell.

29 Claims, 8 Drawing Sheets

SWITCHING FABRIC FOR A DIGITAL TRAFFIC SWITCH

FIELD OF THE INVENTION

The present invention relates to digital traffic switches and, more particularly, to switching fabrics for an asynchronous transfer mode (ATM) switches.

BACKGROUND OF THE INVENTION

An ATM network is a communication internetwork which generally includes multiple LAN switches or end-stations interconnected across an ATM "cloud" which includes a mesh of ATM trunks and ATM switches. Each ATM switch in the cloud typically includes an ATM switching fabric architecture shared by a plurality of input-output (I/O) interfaces. Data traffic, in the form of fixed-length cells, traverses the ATM network over ATM trunks in a series of "hops" between ATM switches. The ATM switch at the end of each hop typically prepares received cell traffic for the next hop by directing the traffic through the switching fabric architecture to one or more destination I/O interfaces. A conventional ATM switching architecture is illustrated in FIG. 1. Data cells are received on I/O interfaces 101–132 associated with input ports 133–164 and are switched through fabric architecture 100 to output ports 165–196 which deliver the cells to destination I/O interfaces 101–132.

A significant technical challenge facing designers of ATM switching fabric architectures is how to guarantee delivery of cell traffic from input ports to output ports while sustaining a high level of throughput. The bandwidth of a single output port of an ATM switching fabric is usually much smaller than the cumulative bandwidth of the input ports. Thus, a scheme for queueing and dequeueing cells destined for the same output port must generally be deployed within a switching fabric to avoid instantaneous congestion. The queueing and dequeueing schemes implemented in most known ATM switching fabrics have been inefficient, either taking too many clock cycles to complete or failing to guarantee resource availability during peak traffic periods. What is needed, then, is a more efficient switching fabric which is suitable for today's high-speed, high-performance digital traffic switches.

SUMMARY OF THE INVENTION

The present invention provides a switching fabric for implementation in a distributed switching fabric architecture of a high-speed, high-performance digital traffic switch that guarantees resource availability and is resource efficient.

In one aspect of the invention, each input port associated with the switching fabric is assigned a distinct time slot in a repetitive timing cycle. Cells received on an input port of the switching fabric are not released until the input port's assigned time slot arrives. The time slot cell release operation, in conjunction with highly efficient serial-to-parallel converters and queue control logic, enables a plurality of small data units for a plurality of particular cells to be converted on a single clock cycle into a plurality of larger parallel data units for the particular cells, and enables a plurality of the larger parallel data units to be written on a single clock cycle into an output queue, without contention. Cell integrity is thereby maintained while cells are transferred through the switching fabric efficiently and contention-free.

In another aspect of the invention, output ports associated with the switching fabric are each assigned to a distinct logical cell queue within the output queue and cells intended for multiple output ports are only written into the fullest logical cell queue associated with one of the destination output ports. By writing the cell into only the fullest logical cell queue, the cell can be dequeued to each destination output port using pointers, without having to replicate the cell and without risking overwriting the cell before it is read out of the output queue to all destination output ports.

The present invention can be better understood by reference to the following detailed description, taken in conjunction with the accompanying drawings which are briefly described below. Of course, the actual scope of the invention is defined by the appended claims.

DETAILED DESCRIPTION OF THE PREFERRED EMBODIMENT

Figure 1:
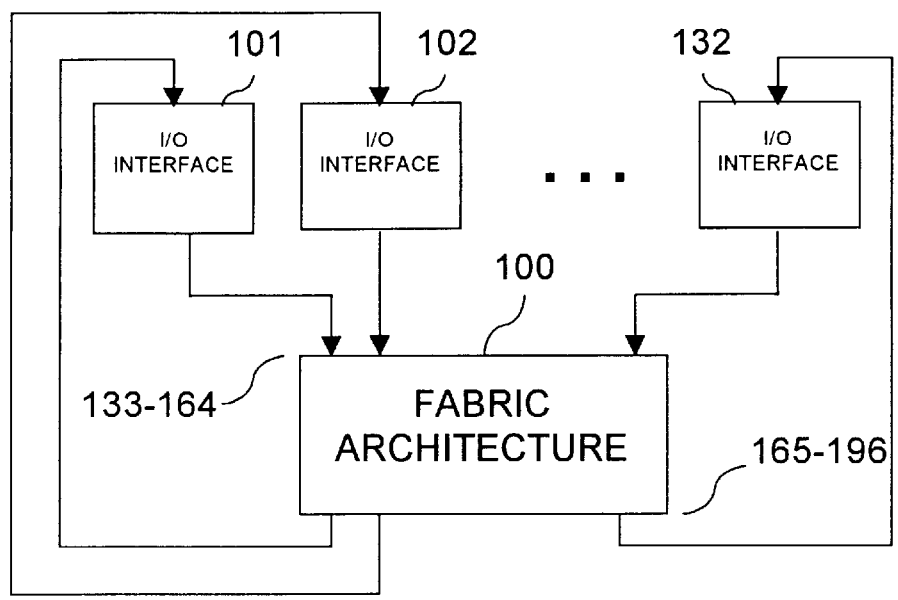
FIG. 1 illustrates a generalized digital traffic switch architecture.
Figure 2:
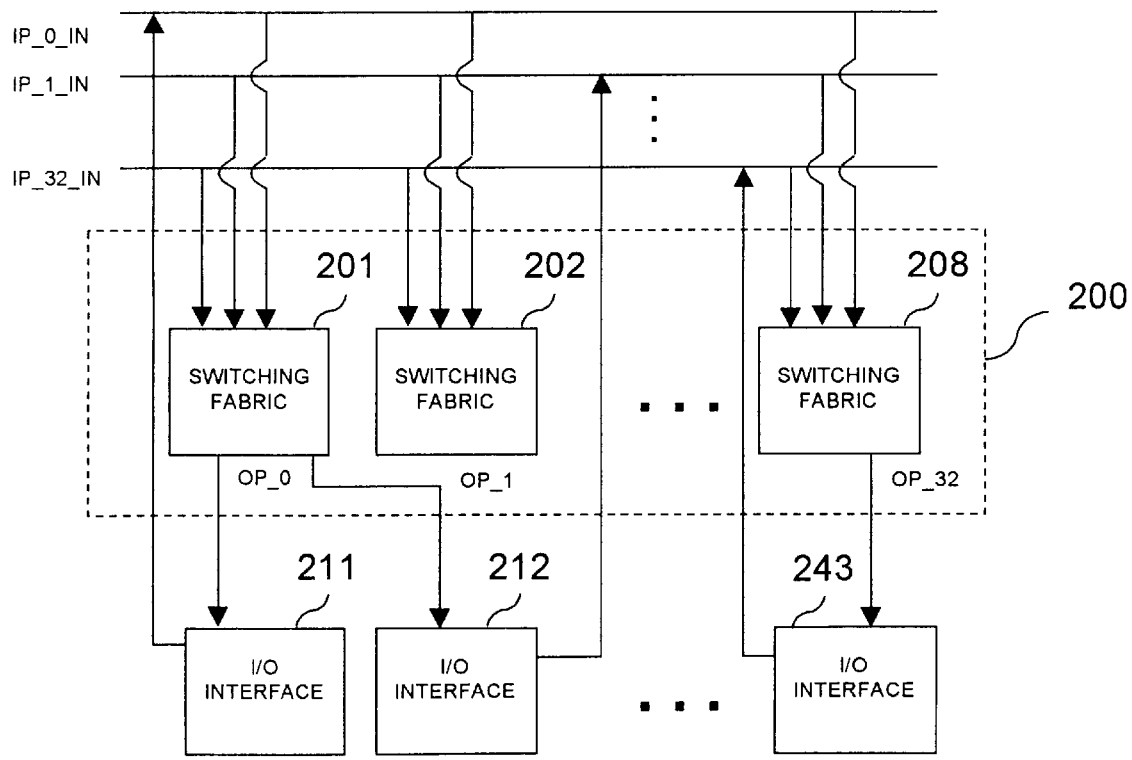
FIG. 2 is a block diagram of a digital traffic switch architecture.

Referring to FIG. 2, a switching fabric architecture 200 is shown having switching fabrics 201–208 operative in accordance with a preferred embodiment of the invention. Fabric architecture 200 interconnects a substantial number of input-output interfaces 211–243, such as input-output processors, across switching fabrics 201–208. Input-output interfaces 211–243 each drive an input port of each switching fabric 201–208 but receive cell traffic from an output port of only one of switching fabrics 201–208. For example, input-output interface 211 drives input port IP_0_IN on each switching fabric 201–208 but only receives traffic output on output port OP_0 associated with switching fabric 201. Each of switching fabrics 201–208 preferably has a common traffic shaping, routing, storing and forwarding capability described in greater detail herein. Although FIG. 2 illustrates a switching fabric architecture 200 having eight switching fabrics 201–208, the number of switching fabrics implemented in a switching fabric architecture may vary. It should also be appreciated that a switching fabric architecture may support inputs from an interface for which there is no corresponding output to the interface, or may support outputs to an interface for which there is no corresponding input from the interface.

Figure 3:
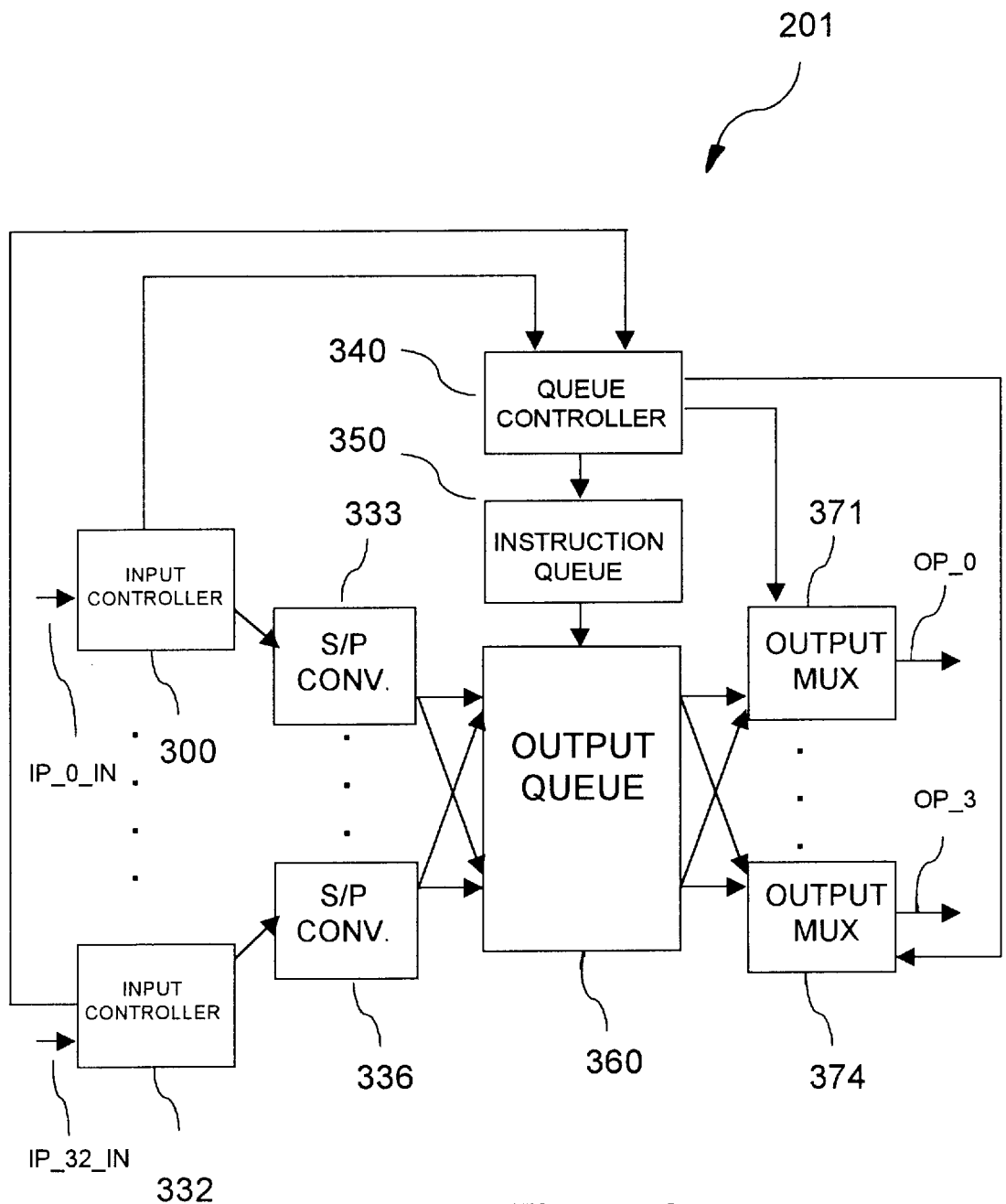
FIG. 3 is a block diagram of a switching fabric in accordance with the present invention, operating within the switching fabric architecture of FIG. 2.

Referring now to FIG. 3, switching fabric 201 is shown in greater detail in a preferred embodiment of the invention. Switching fabric 201 includes multiple input ports IP_0_IN through IP_32_IN. Fixed-length cells are preferably received on input ports IP_0_IN through IP_32_IN from associated input-output interfaces 211–243 at a rate of five bits per clock and delivered at the same rate to each intended destination input-output interface, if any, associated with one of output ports OP_0 through OP_3. Each successive five-bit segment of a cell, beginning with bits zero through four, is referred to herein as a "quint". In a preferred embodiment, ATM cells are contemplated, with control fields appended to the cells causing cell length to exceed the conventional 53-byte length. More particularly, each cell preferably has twenty-six appended control bits giving each cell a total length of four hundred fifty bits.

As shown in FIG. 3, input ports IP_0_IN through IP_32_IN are each associated with one of input controllers 300–332. Controllers 300–332 are operative to filter cells that are not intended for any output port associated with switching fabric 201 and operative to effectuate, in conjunction with other control logic described herein, a time slot cell release operation. Input controllers 300–332 are each associated with one of a smaller number of serial-to-parallel converters 333–336 operative to efficiently convert same-cell quints received from input controllers 300–332 into larger, parallelized words for writing into output queue 360. In a preferred embodiment, four serial-to-parallel converters 333–336 are shared among thirty-three input controllers 300–332. Thus, for example, serial-to-parallel converter 333 may receive on a single clock a quint from nine input ports IP_0 through IP_8 via input controllers 300–308. Output queue 360 is configured to receive on a single clock cycle a parallelized word from each of serial-to-parallel converters 333–336 and to write a plurality of such parallelized words into memory on a single clock cycle in a manner that will enable cells to be dequeued from output queue 360 in a series of successive same-cell parallelized words. Switching fabric 201 further includes output multiplexors 371–374 for retrieving the successive same-cell words from output queue 360 and serializing the words for forwarding at a rate of one quint per clock on output ports OP_0 through OP_3, respectively. Switching fabric 201 also includes queue controller 340, which directs the orderly writing of cells from converters 333–336 to output queue 360 with the assistance of instruction queue 350, and also directs the orderly dequeueing of cells from output queue 360, in a manner hereinafter described in greater detail.

Figure 4:
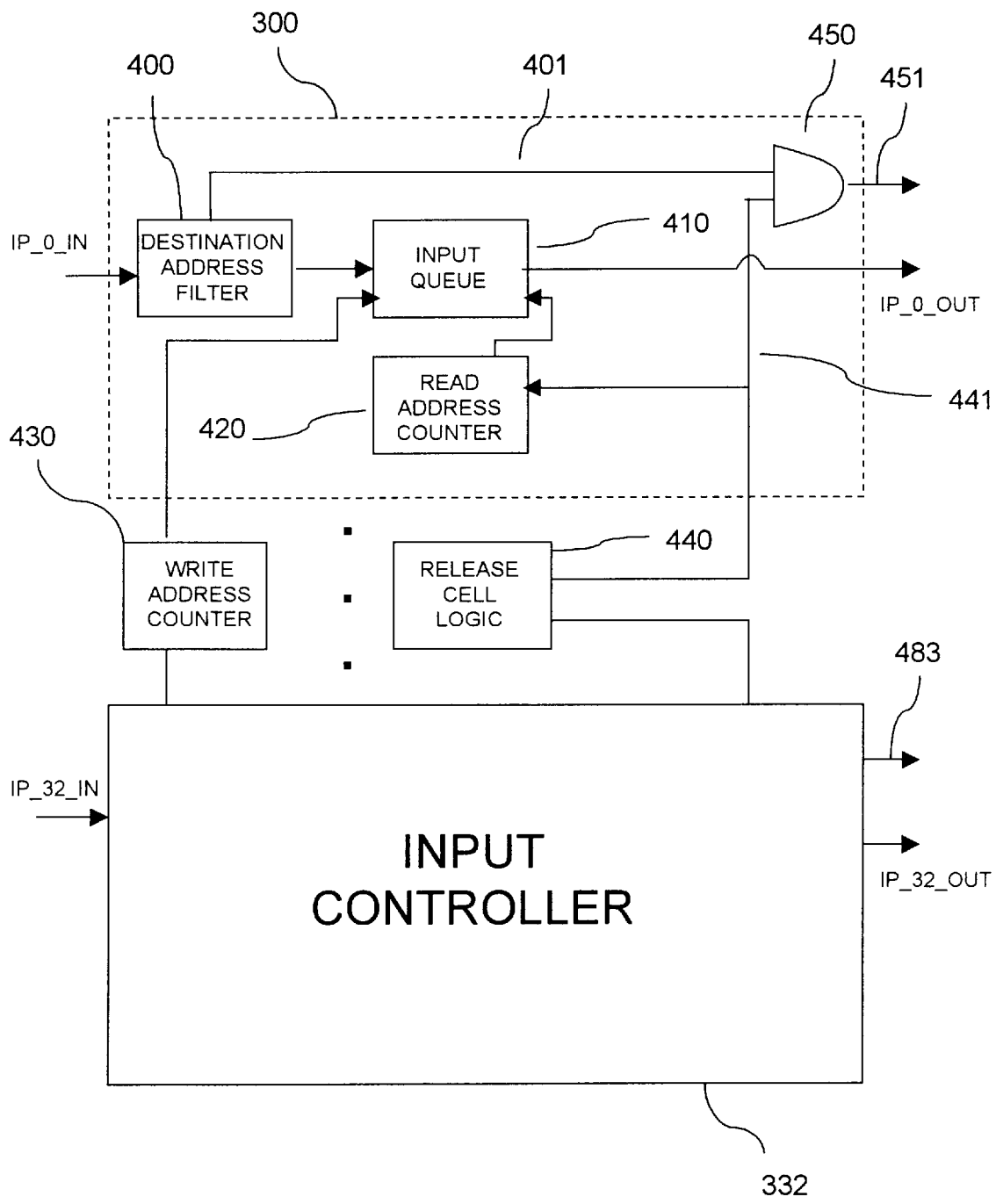
FIG. 4 is a block diagram of the input controllers operative within the switching fabric of FIG. 3.

Turning now to FIG. 4, input controllers 300–332 are shown in greater detail. Input controllers 300–332 will be described by reference to input controller 300, which is representative of controllers 300–332. Input controller 300 preferably has dedicated components, including cell destination address filter 400, input queue 410 and read address counter 420, and preferably shares other components, including write address counter 430 and release cell logic 440, with other input controllers 301–332. Destination address filter 400 preferably includes four destination address registers, each of which is programmed with an address associated with a different one of output ports OP_0 through OP_3. Destination address filter 400 is operative to compare for a match the destination addresses encoded in incoming cells with the registered addresses. Destination address filter 400 filters cells for which no match is found. Destination address filter 400 captures cells for which a match is found and claims a line within match line set 401 for each one of output ports OP_0 through OP_3 which is an intended destination of the cell. Although illustrated as a single line in FIG. 4, match line set 401 may be advantageously configured as four separate lines associated with different ones of output ports OP_0 through OP_3.

Cells captured by destination address filter 400 are written into input queue 410 in a series of quints. In a preferred embodiment, a time slot cell release operation is implemented in which each of the thirty-three input controllers 300–332 are assigned a distinct "start cell release" time slot within a repetitive 45-clock cycle timing cycle. The timing cycle dictates a minimum size for input queue 410 in order to effectuate the time slot cell release operation without risking input queue overflow, since queue 410 must have sufficient capacity to store all quints received until the time slot assigned to its associated input controller 300 arrives. Thus, in a preferred embodiment, input queue 410 is a physical memory element having a forty-five quint capacity. The queue address into which quints are written is determined by write address counter 430, which has a free-running 45-cycle clock shared by input controllers 300–332.

Cells are read out of input queue 410 by read address counter 420 in accordance with the time slot cell release operation. Read address counter 420 has a 45-cycle clock which causes quints to be read first-in, first-out (FIFO) from input queue 410. More particularly, when the "start cell release" time slot assigned to input controller 300 arrives, release cell logic 440 validates time alignment strobe 441 instructing read address counter 420 to begin a FIFO read of the contents of input queue 410 at a rate of one quint per clock. Read address counter 420 continues reading for a total of 90-clock cycles to read the entire 450-bit cell from input queue 410. The dequeued cell is transmitted in a series of quints to serial-to-parallel converter 333 on dedicated output pin IP_0_OUT.

Input controller 300 also has gate element 450. Contemporaneous with the instruction to begin the FIFO read of input queue 410 time alignment strobe 441 instructs gate 450 to release, on cell start line set 451, any valid signals gated-off on lines of match line set 401. Accordingly, one or more lines in cell start line set 451 will become valid on the same clock cycle that the first quint of a cell is transmitted from controller 300 to serial-to-parallel converter 333. Gate element 450 may be configured advantageously as four separate "and" gates each interconnecting one of four lines in match line set 401 with one of four lines in cell start line set 451, with each match line and cell start line pair being associated with a particular one of output ports OP_0 through OP_3.

The time slot cell release operation just described, offset to account for different time slot assignments, occurs contemporaneously on each of input controllers 300–332 so that a continuous stream of time-aligned quints are transmitted from input controllers 300–332 to serial-to-parallel converters 333–336. Thus, as the thirty-third quint of a cell is being released by input controller 300 (assigned clk_0) on IP_0_OUT, the first quint of a cell may be released by input controller 332 (assigned clk_32) on IP_32_OUT with one or more cell start lines in set 483 also becoming valid. It will be appreciated, however, that due to non-constant traffic patterns and the destination address filtering operation performed by input controllers 300–332, the assigned time slot for any particular controller may pass without the release of a new cell and, correspondingly, without any line within a cell start line set becoming valid.

Figure 5:
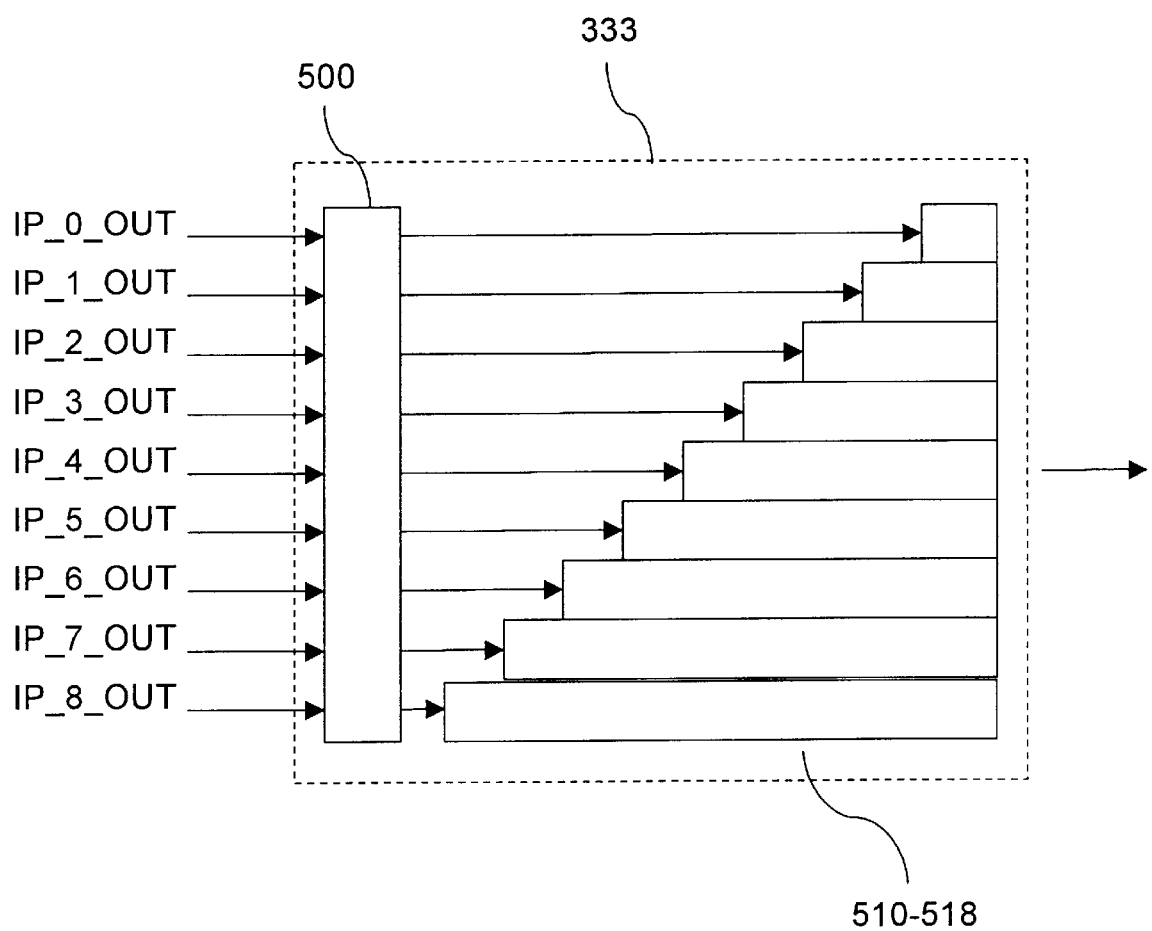
FIG. 5 is a block diagram of a serial-to-parallel converter operative within the switching fabric of FIG. 3.

Referring now to FIG. 5, serial-to-parallel converter 333, which is considered representative of converters 333–336, is shown in greater detail. Converter 333 includes a rotator 500 followed by nine linearly-incrementing shift registers 510–518 (i.e., nine shift registers having length one through nine, respectively). Provided that all associated output pins IP_0_OUT through IP_8_OUT are transmitting quints on the particular clock cycle, converter 333 receives one quint from each one of output pins IP_0_OUT through IP_8_OUT and applies the quints to different ones of registers 510–518. Rotator 500 rotates on each clock such that the quints arriving from a particular one of pins IP_0_OUT through IP_8_OUT are applied successively to incrementally shorter ones of registers 510–518. Where the previous quint from a particular one of pins IP_0_OUT through IP_8_OUT was applied to register 510 (having length one), the next quint is applied to (the longest) register 518. The contents of each of shift registers 510–518 shift forward one length at each clock cycle. Thus, quints received from a particular one of pins IP_0_OUT through IP_8_OUT remain linearly-aligned as the quints traverse shift registers 510–518, and are accumulated until nine associated quints arrive concurrently at the front of shift registers 510–518. On the subsequent clock cycle, converter 333 outputs a 45-bit parallel word assembled from the nine associated quints.

From the foregoing description of converter 333 it should be apparent that, in a maximum throughput situation, converter 333 produces on each clock cycle a 45-bit parallel word from one of input controllers 300–308, and produces a 45-bit parallel word once every nine clocks from the same one of input controllers 300–308. Thus, for instance, on clock cycles n and n+9, converter 333 may produce a 45-bit parallel word from input controller 300; on clock cycles n+1 and n+10, converter 333 may produce a 45-bit parallel word from input controller 301; and so on. It should also be apparent that, in a maximum throughput situation, converters 333–336 produce on each clock cycle a total of four 45-bit parallelized words comprising inputs from four different ones of input controllers 300–332, and produce a 45-bit parallel word once every nine clocks from the same set of four input controllers 300–332. Thus, for instance, on clock cycle n, converters 333–336 may produce 45-bit parallel words from input controllers 300, 309, 318, 327, respectively; on clock cycle n+1, converters 333–336 may produce 45-bit parallel words from input controllers 301, 310, 319, 328, respectively; on clock cycle n+9, converters 333–336 may again produce 45-bit parallel words from input controllers 300, 309, 318, 327, respectively; and so on. Of course, in a preferred embodiment, twelve time slots within the 45-clock cycle are not assigned to any of input controllers 300–332 and, in any given timing cycle, assigned slots may not be utilized. Therefore, 45-bit parallel words will not be produced by each of converters 333–336 on each clock cycle.

The time-aligned serial-to-parallel conversion just described has two important effects. First, it ensures that each 45-bit parallel word produced by serial-to-parallel converters 333–336 contains only same-cell quints. Second, it ensures that the up to four 45-bit parallel words produced on any particular clock cycle are from different locations along the length of different cells. For instance, on the same clock cycle that the first 45-bit word of a cell (bits 0 through 44) received from input controller 309 (assigned clk_9) is produced by converter 334, a second or seventh 45-bit word of a cell (bits 45 through 89) received from input controller 300 (assigned clk_0), if any, will be produced by converter 333. As a consequence, the four words produced by converters 333–336 on any given clock will not have to compete for resources when being written into output queue 360, as will become more evident from the description below.

Figure 6:
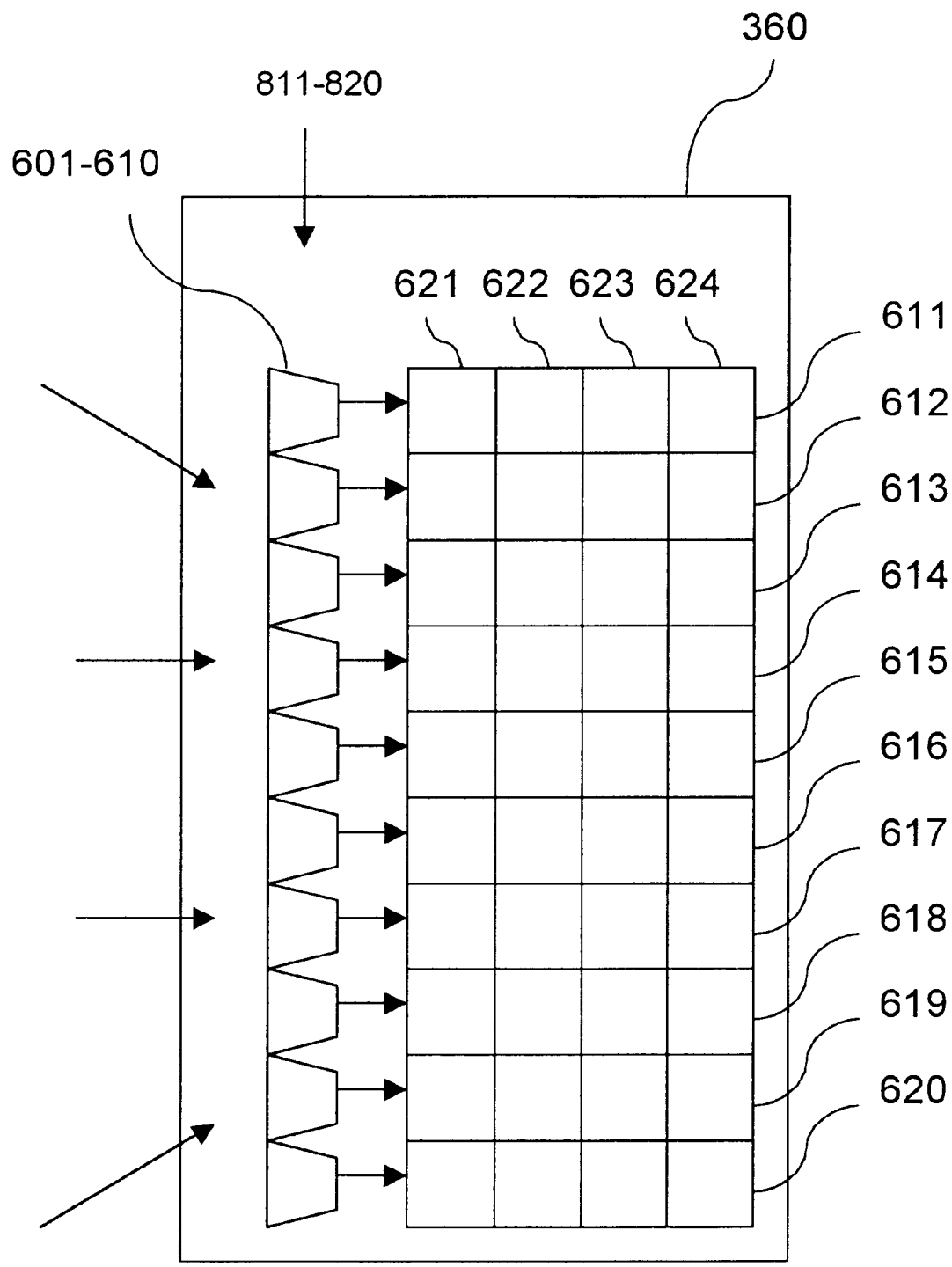
FIG. 6 is a block diagram of the output queue operative within the switching fabric of FIG. 3.

Referring now to FIG. 6, output queue 360 is shown in greater detail. Output queue 360 includes an array of four-to-one multiplexors 601–610 each followed by one of physical memories 611–620. Physical memories 611–620 each have the capacity to store numerous 45-bit words delivered from their associated one of multiplexors 601–610. In a preferred embodiment, physical memories 611–620 are each able to store two-hundred fifty-six 45-bit words. Physical memories 611–620 are "stacked" such that they combine to form four distinct logical cell queues 621–624, with each logical cell queue having the capacity to store numerous 450-bit cells composed of ten 45-bit words each. In a preferred embodiment, each of the four logical cell queues 621–624 can store sixty-four (i.e., 256 divided by four) cells. Logical cell queues 621–624 are each associated generally with a particular one of output ports OP_0 through OP_3. Thus, 45-bit words associated with cells destined for output port OP_0 are generally written to logical cell queue 621; 45-bit words associated with cells destined for output port OP_1 are generally written to cell queue 622; and so on. This general rule of one-to-one correspondence between logical cell queues 621–624 and output ports OP_0 through OP_3 is modified in the case of queueing of multicast cells (i.e., cells intended for more than one of output ports OP_0 through OP_3), as is described in more detail herein. Physical memories 611–620 are preferably dual-ported so that queuing and dequeuing of different cells can proceed simultaneously, in a manner hereinafter described.

Figure 7:
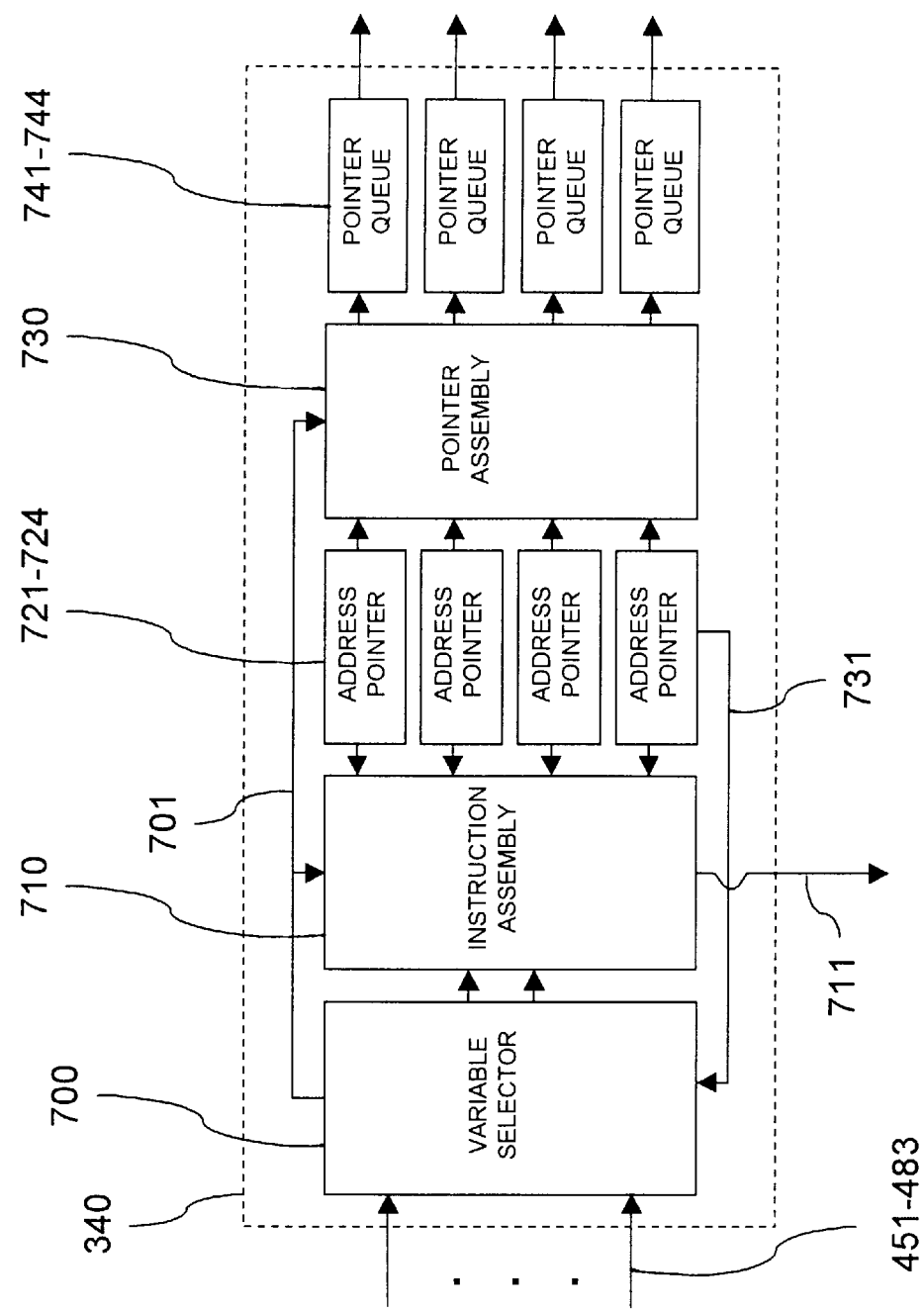
FIG. 7 is a block diagram of the queue controller operative within the switching fabric of FIG. 3.

The queueing of unicast cells (i.e., cells intended for only one of output ports OP_0 through OP_3) into output queue 360 is controlled by queue controller 340 in conjunction with instruction queue 350. Referring to FIG. 7, queue controller 340 is shown in greater detail. The queueing function of queue controller 340 is implemented using variable selector 700, instruction assembly 710 and address pointers 721–724.

Variable selector 700 generates commands used to direct cells to the correct one of logical cell queues 621–624. Variable selector 700 has as inputs cell start match line sets 451–483 and generates commands associating each valid line in cell start line sets 451–483 with a particular one of logical cell queues 621–624 and a particular one of serial-to-parallel converters 333–336. This is possible because of the known association of each line with a particular input port and output port. In a preferred embodiment, a mux steering command and a cell queue command is generated for each cell. Each mux steering command is preferably a two-bit command indicating which one of convertors 333–336 mulxiplexors 601–610 must select 45-bit words from to effectuate the writing of the cell into output queue 360. Each cell queue command is preferably a two-bit command indicating into which one of the logical cell queues 621–624 the selected 45-bit words should be written.

Address pointers 721–724 hold values which are used to direct cells to the correct address within the correct one of logical cell queues 621–624. Each of address pointers 721–724 is associated with one of logical cell queues 621–624 and holds a value corresponding with the next one of the addresses to be written in its associated queue. Thus, in a preferred embodiment, pointers 721–724 each hold six bits which together represent one of sixty-four possible addresses. Address pointers 721–724 also have associated therewith queue level logic (not shown) which tracks dynamically the number of yet to be dequeued cells in each of logical cell queues 621–624. Address pointer values are revised upward or downward incrementally by queue level logic as cells are queued and dequeued. Queue level logic stores in registers or other suitable memory elements known to the art information regarding the current number of cells in each of logical cell queues 621–624.

Instruction assembly 710 assembles information provided by variable selector 700 and address pointers 721–724 into a useful write instruction. Instruction assembly 710 has lines on variable selector and address pointers 721–724. In a preferred embodiment, each instruction is an 11-bit instruction including a one-bit write enable command, a two-bit mux steering command and a two-bit cell queue command from variable selector 700, and a six-bit address from the one of address pointers 721–724 associated with the indicated logical cell queue. The assembled instructions are transmitted to instruction queue 350 on instruction line 711.

The variable selector 700, instruction assembly 710 and address pointers 721–724 may be implemented in custom circuitry using elements and techniques well known to the art. It will be appreciated that because of the time slot cell release operation described previously, lines from only one of cell start match line sets 451–483 will be valid on any given clock cycle, advantageously avoiding problems associated with competition for the queue control resources just described.

Figure 8:
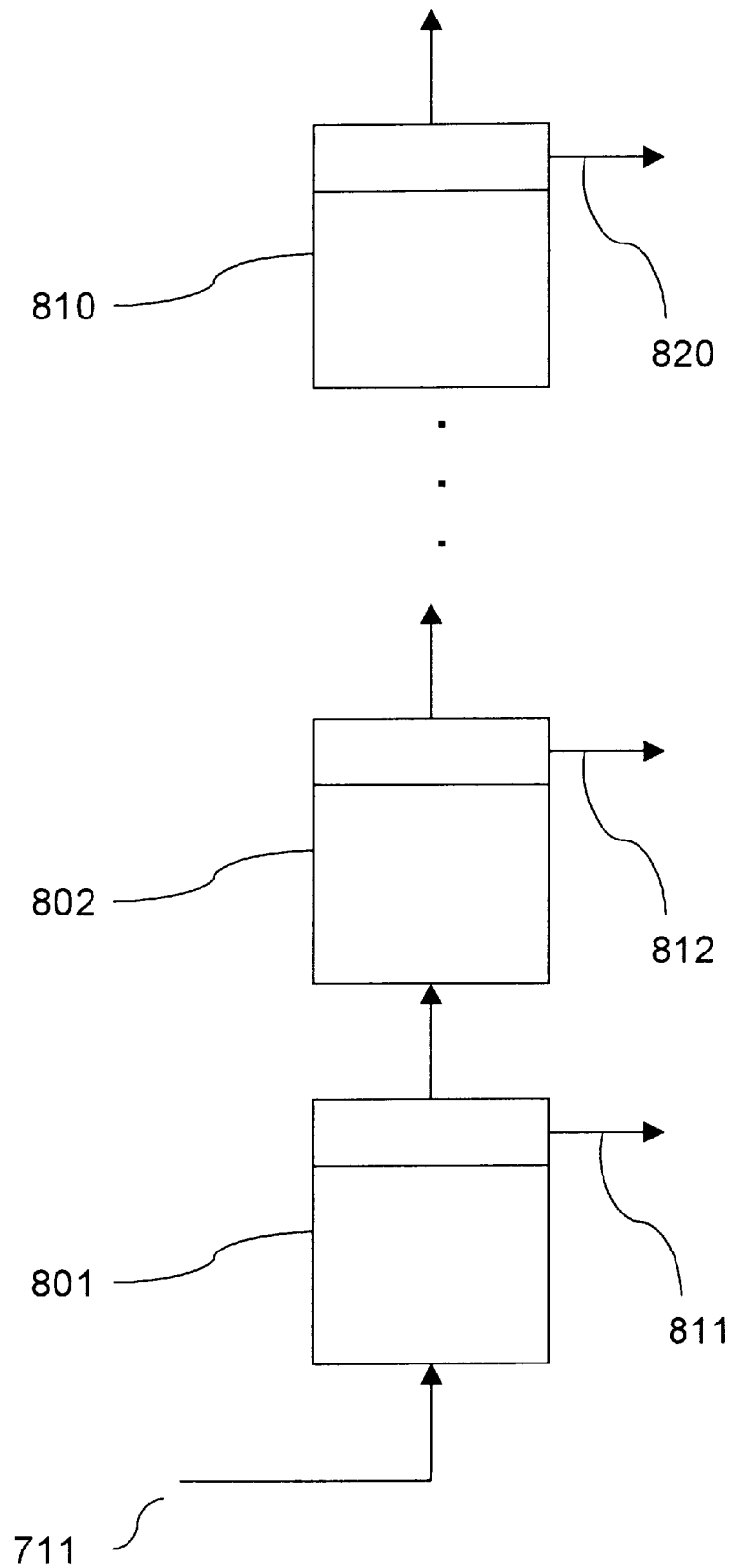
FIG. 8 is a block diagram of the instruction queue operative within the switching fabric of FIG. 3.

Referring to FIG. 8, instruction queue 350 is shown in more detail. Instructions received on instruction line 711 are "tapped-off" registers within instruction queue 350 at regular intervals to cause successive multiplexors 601–610 to write into successive physical memories 611–620 successive 45-bit words which together comprise a complete cell. Instruction queue 350 may be configured as a series of multi-stage shift registers equal in number to the total number of parallelized words which are produced by switching fabric 201 for each cell. Except for the first one of registers, the number of stages for each of registers will generally be equal in length to the number of clock cycles required by switching fabric 201 to produce each parallelized word. In a preferred embodiment, switching fabric 201 produces a total of ten 45-bit words for each cell, and produces one word every nine clock cycles. Thus, instruction queue 350 is operatively configured as a series of ten shift registers 801–810, with registers 802–810 having nine-stages each and first register 801 having a lesser number of stages to account for the clock cycles spent after a cell is released generating an instruction from the asserted cell start line and transmitting the instruction to instruction queue 350. Instructions arriving on instruction line 711 are placed at the tail of the first register 801 and progress through register 801 as the first 45-bit parallel word is being prepared by one of converters 333–336 from the first nine quints of the cell. On the same clock cycle that the first 45-bit parallel word is released, instruction 811 is "tapped-off" the front of first register 701 to control first multiplexor 601. More particularly, the instruction instructs multiplexor 601 to select a particular one 45-bit word from among the up to four 45-bit words released by serial-to-parallel converters 333–336 on the particular clock cycle, and to write the selected word to a particular location in physical memory 611. The instruction is queued to the tail of second shift register 702 and nine clocks later controls multiplexor 602 in similar fashion. This process is repeated until instruction 720 has controlled each one of multiplexors 601–610 in sequence and caused each of the ten 45-bit words comprising a complete cell to be written to the desired locations in physical memories 611–620. While the operation of instruction queue 350 has been described in relation to a single cell, multiple instructions will generally traverse instruction queue 350 simultaneously to control successive multiplexors 601–610. Thus, instructions may be "tapped-off" from different ones of registers 801–810 on the same clock cycle and result in all of the up to four words produced by converters 333–336 being written into desired locations within logical cell queues 621–624.

Returning to FIG. 7, dequeueing of unicast cells is accomplished primarily by pointer assembly 730 and pointer queues 741–744 using information supplied by variable selector 700 and address pointers 721–724. Pointer queues 741–744 are each associated with a particular one of logical cell queues 621–624 and each have the capacity to store a number of read pointers equal in number to the number of addresses in its associated logical cell queue. Pointer assembly 730 receives cell queue commands from variable selector 700 and also has lines on address pointers 721–724. Assembly 730 assembles read pointers from the cell queue commands and the addresses supplied by variable selector 700 and address pointers 721–724, respectively. In a preferred embodiment, each assembled read pointer is an eight-bit pointer including a two-bit cell queue command and a six-bit address from the one of address pointers 721–724 associated with the indicated logical cell queue. The assembled read pointers are generally loaded at the tail of the one of pointer queues 741–744 associated with the indicated logical cell queue. Dequeueing is accomplished reading cells FIFO from logical cell queues 621–624 using pointers from pointer queues 741–744. Output multiplexors 371–374 are associated with pointer queues 741–744, respectively. Queue controller 340 instructs output multiplexors 371–374 whenever there is a cell to be dequeued from output queue 360 and where to locate the cell. Cells are read from output queue 360 in successive 45-bit words (i.e., reading same-cell 45-bit words from each of the ten physical memories 611–620 until the complete cell is read-out). Memory reads are staggered so that two or more multiplexors 371–374 do not attempt to read from the same one of physical memories 611–620 on the same clock cycle. Output multiplexors 371–374 serialize each 45-bit word into a series of nine quints to be output successively on the associated one of output ports OP_0 through OP_3. For example, a dequeued cell destined for output port OP-0 would be received in a series of successive 45-bit words on output multiplexor 371, which would perform a serializing operation to convert each of the ten 45-bit parallel words into a series of nine quints output on OP_0. Multiplexors 371–374 inform queue controller 340 when cell reads have been completed so that the queue level can be decremented. Pointer assembly 730 and pointer queues 741–744 may be implemented in custom circuitry using elements and techniques well known to the art.

In a preferred embodiment, queueing and dequeueing of multicast cells is conducted with the additional assistance of computational logic implemented in variable selector 700. Where more than one cell start line within a set is valid, computation logic is invoked to identify which of the logical cell queues 621–624 associated with a valid line is the fullest. Variable selector 700 transmits to instruction assembly 710 a cell queue command indicating as the queue to be written only the logical cell queue identified by the computational logic. Queueing to the identified logical cell queue proceeds otherwise as described previously. However, variable selector 700 also transmits to pointer assembly 730 information sufficient to enable pointer assembly 730 to identify all destination output ports for the multicast cell. Pointer assembly 730 assembles a number of read pointers equal to the total number of identified destination output ports and loads the assembled pointers at the tail of each of the pointer queues 741–744 associated with an identified destination output port. Dequeueing proceeds otherwise as described previously. It will be appreciated that by queuing multicast cells to the fullest queue only and replicating pointer commands, multicast cells can be advantageously read from output queue 360 to each intended destination output port without the need to replicate the entire 450-bit cell, and without risking overwriting the once-written cell before it is dequeued to all destination output ports. In a preferred embodiment, the computational logic block which determines the fullest queue has access to information regarding the current number of cells in each of logical cell queues 621–624 via queue level signal 731, which may be advantageously configured as four separate lines on queue level registers associated with address pointers 721–724. The computational logic block utilizes that information in a "king of the hill" algorithm that performs one or more comparative operations that each involve two logical cell queues associated with destination output ports, until it is conclusively determined which queue associated with a destination output port is the fullest. The fuller of the queues as determined by each comparative operation is considered the "victor" and is compared with other "victors" until a "king" is determined. By way of example, where a cell is destined to each of output ports OP_0 through OP_3, logical cell queues 621 and 622 may be compared to determine which is fuller, and logical cell queues 623 and 624 may be compared to determine which is fuller. The two fuller queues as determined from these comparisons are "victors" and are compared with one another to determine which of the "victors" is "king" (i.e., the fullest queue).

Figure 9:
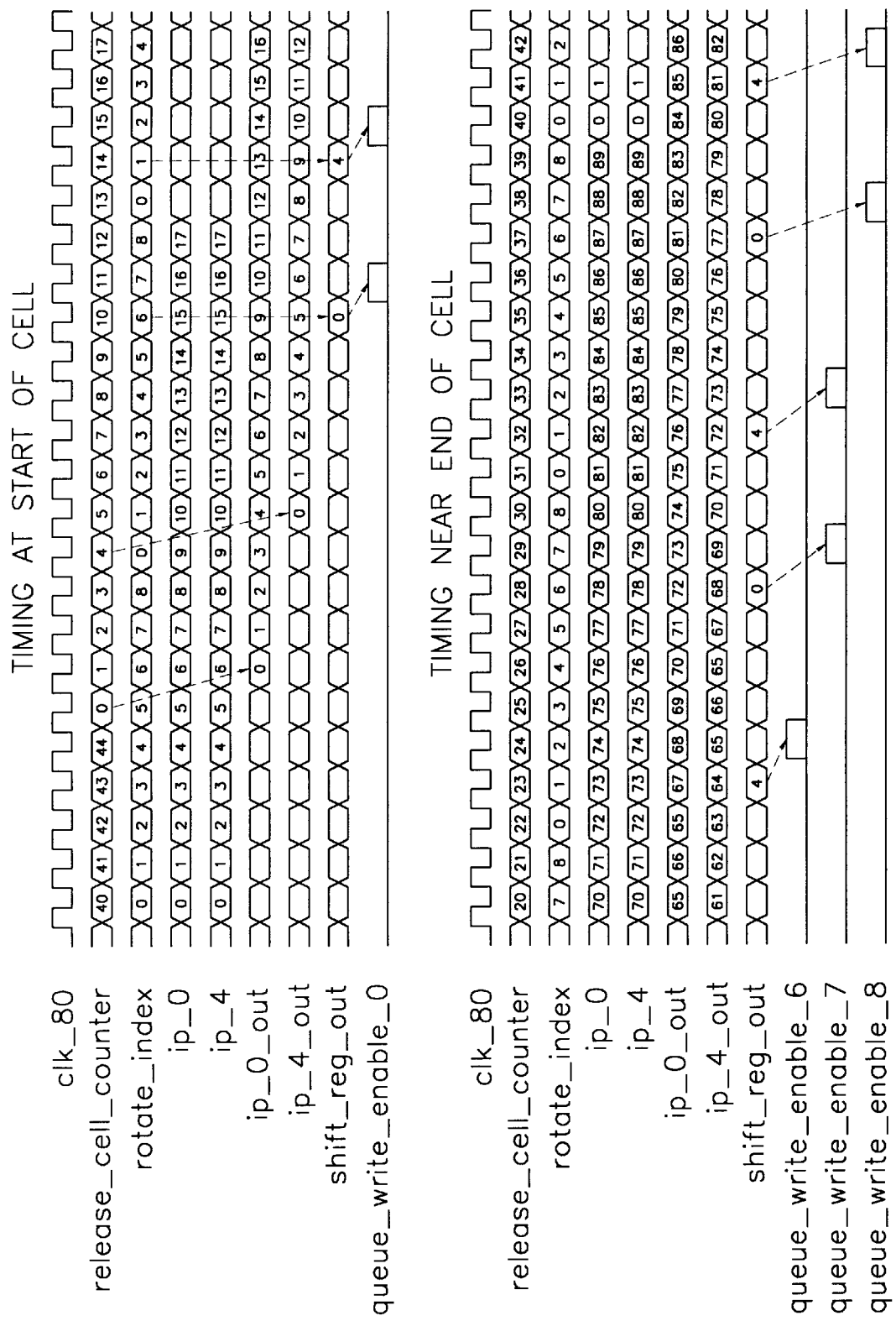
FIG. 9 is a timing diagram illustrating operation of the switching fabric of FIG. 3.

Turning now to FIG. 9, a timing diagram is presented to illustrate the manner in which two cells arriving concurrently on input ports IP_0_IN and IP_4_IN are queued in switching fabric 201. Clock signal clk_80 is a master clock that controls all timing within switching fabric 201. Release cell counter signal release_cell_counter is a free-running 45-cycle clock indicating when release cell logic 440 should initiate a cell start. A further nine-clock counter signal rotate_index provides an index relied upon by rotator 500 to apply quints to the appropriate ones of linearly-incrementing shift registers 510–518. Signals ip_0_in and ip_4_in represent which quint of a cell, from zero to eighty-nine, is applied to input ports IP_0_IN and IP_4_IN, respectively. Signals ip_0_out and ip_4_out represent which quint of a cell, from zero to eighty-nine, is applied to output pins IP_0_OUT and IP_4_OUT, respectively. Signal $shift_{13}$ reg_out identifies the input port (IP_0_IN through IP_0_32) for which a 45-bit word has been produced by converter 333. Signal queue_write_enable_0 is a pulse signal which, when pulsed high, indicates that the first 45-bit word of a cell are being written to output queue 360 (i.e., into physical memory 611). Signals queue_write_enable_6 and queue_write_enable_7 are similar pulse signals indicating when the seventh and eighth 45-bit words, respectively, of a cell are being written to output queue 360.

In the example illustrated in FIG. 9, when cells arrive concurrently at input ports IP_0_IN and IP_4_IN, release cell counter signal release_cell_counter displays a reading of forty. The cell on input port IP_0_IN is therefore delayed within input controller 300 until the release cell counter has counted through forty-four and reverted back to zero, which is the time slot assigned to input port IP_0_IN. On clock zero, the cell begins to be read from input controller 300 onto pin IP_0_OUT, as indicated by the signal ip_0_out. The cell at input port IP_4, meanwhile, is delayed for four additional clocks until the release cell counter signal displays a reading of four, which is the time slot assigned to input port IP_4_IN.

Nine clocks are required to accumulate nine quints in a serial-to-parallel converter. Therefore, nine clocks after the first quint from the cell on input port IP_0_IN is applied to converter 333, signal shift_reg_out indicates the production of a first 45-bit parallelized word from the cell on input port IP_0_IN. On the next clock, the first 45-bit word is written to physical memory 611, as indicated by queue_write_enable_0 being pulsed high. Four clocks thereafter, a similar write operation is performed on a first 45-bit word from the cell on input port IP_4_IN, as indicated by queue_write_enable_0 again being pulsed high. The operation of the present switching fabric proceeds in this manner, as shown at the bottom of FIG. 9, until the ten 45-bit words comprising a complete cell have been written to each of physical memories 611–620 for each of the cells on each of input ports IP_0_IN and IP_4_IN.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come within the meaning and range of equivalents thereof are intended to be embraced therein.

I claim:

1. In a digital traffic switch, a switching fabric for transferring data from a plurality of input ports to a plurality of output ports, comprising:

m input ports, where m is an integer greater than one;

n output ports, where n is an integer greater than one;

means for assigning to each input port a different time slot within a repetitive cycle;

means associated with each input port for delaying an input data signal;

means for releasing from each delaying means successive first bit blocks of the input data signal, beginning on the time slot assigned to the input port associated with the delaying means;

means for converting the successive first bit blocks into successive second bit blocks, wherein the second bit blocks have a larger bit count than the first bit blocks; and means for writing into an output queue the successive second bit blocks.

2. The switching fabric according to claim 1, further comprising:

means for reading from the output queue the successive second bit blocks; and means for delivering the successive second bit blocks to at least one output port, the successive second bit blocks together constituting a discrete information unit.

3. The switching fabric according to claim 1, wherein each delay means includes a memory element for retaining the first bit blocks and means for writing the first bit blocks into the memory element.

4. The switching fabric according to claim 1, wherein the releasing means includes means for reading the successive first bit blocks from a memory element and means for prompting the reading means to begin reading the successive first bit blocks on the time slot assigned to the input port.

5. The switching fabric according to claim 1, wherein the converting means includes a rotator and a set of linearly-incrementing shift registers.

6. The switching fabric according to claim 1, wherein the output queue has successive physical memories and wherein the writing means includes instructions for prompting successive multiplexers to write the successive second bit blocks into the successive physical memories.

7. The switching fabric according to claim 6, wherein the instructions comprise multiple instances of the same instruction tapped-off successive registers to prompt the successive multiplexers.

8. The switching fabric according to claim 2, wherein the output queue has successive physical memories and wherein the reading means includes a pointer for reading the successive second bit blocks from the output queue.

9. In a switching fabric for a digital traffic switch, an apparatus for queueing and dequeueing data received on a plurality of input ports, comprising:

n input ports, where n is an integer greater than one;

means for assigning to each input port a time slot within a repetitive cycle;

means associated with each input port for delaying an input data signal;

means for releasing, consecutively, from each delaying means successive first bit blocks of the input data signal, beginning on the time slot assigned to the input port associated with the delaying means;

means for converting, consecutively, the successive first bit blocks into successive second bit blocks, wherein the second bit blocks have a larger bit count than the first bit blocks;

means for writing into an output queue, consecutively, the successive second bit blocks; and means for reading from the output queue, consecutively, the successive second bit blocks.

10. The apparatus according to claim 9, wherein the time slot assigned to each input port is different.

11. The apparatus according to claim 9, wherein each delaying means includes a memory element for retaining the first bit blocks and means for writing the first bit blocks into the memory element.

12. The apparatus according to claim 9, wherein the releasing means includes a second reading means for reading the successive first bit blocks from a memory element and means for prompting the second reading means to begin reading the successive first bit blocks on the time slot assigned to the input port.

13. The apparatus according to claim 9, wherein the converting means includes a rotator and a set of linearly-incrementing shift registers.

14. The apparatus according to claim 9, wherein the output queue has successful physical memories and wherein the writing means includes instructions for prompting successive multiplexers to write the successive second bit blocks into the successive physical memories.

15. The apparatus according to claim 14, wherein the instructions comprise multiple instances of the same instruction tapped-off successive registers to prompt the successive multiplexers.

16. The apparatus according to claim 9, wherein the output queue has successive physical memories and wherein the reading means includes a pointer for reading the successive second bit blocks from the successive physical memories.

17. In a switching fabric for a digital traffic switch, an apparatus for queuing data received on a plurality of data input ports, comprising:

n input ports, where n is an integer greater than one;

means for assigning to each input port a time slot within a repetitive cycle;

means associated with each input port for delaying an input data signal;

means for releasing, consecutively, from each delaying means successive first bit blocks of the input data signal, beginning on the time slot assigned to the input port associated with the delaying means;

means for converting, concurrently, a plurality of the successive first bit blocks into the plurality of successive second bit blocks wherein the second bit blocks have a larger bit count than the first bit blocks; and means for writing into an output queue, concurrently, a plurality of the successive second bit blocks.

18. The apparatus according to claim 17, wherein the time slot assigned to each input port is different.

19. The apparatus according to claim 17, wherein the delaying means includes a memory element for retaining first bit blocks and means for writing the first bit blocks into the memory element.

20. The apparatus according to claim 17, wherein the releasing means includes means for reading the successive first bit blocks from a memory element and means for prompting the reading means into beginning to read the successive first bit blocks from the memory element on the time slot assigned to the input port.

21. The apparatus according to claim 17, wherein the converting means includes a plurality of rotators and a plurality of sets of linearly-incrementing shift registers.

22. The apparatus according to claim 17, wherein the output queue has physical memories and wherein the writing means includes a plurality of sets of instructions for prompting a plurality of multiplexers to write a plurality of the second bit blocks into a plurality of the physical memories.

23. The apparatus according to claim 22, wherein each instruction within each set of instructions comprises multiple instances of the same instruction tapped-off successive registers to prompt successive multiplexors.

24. In a switching fabric for transferring data units from a plurality of input ports to a plurality of destination output ports, an apparatus for queueing and dequeueing multicast data units, comprising:

a plurality of logical data queues;

a plurality of pointer queues, each associated with a different destination output port;

means for determining which one of the logical data queues is the fullest;

means for writing a multicast data unit into the fullest logical data queue only;

means for writing a pointer to the multicast data unit into each pointer queue; and means for using each pointer to read the multicast data unit from the logical data queue toward each destination output port.

25. The apparatus according to claim 24, wherein the means for determining the fullest queue utilizes a "king of the hill" algorithm.

26. The apparatus according to claim 24, wherein each logical data queue comprises dedicated portions of a plurality of physical memories.

27. In a switching fabric for a digital traffic switch, a method for transferring data, comprising the steps of:

receiving a plurality of input signals on their respective input ports;

assigning to each input port a different time slot within a repetitive cycle;

delaying an input data signal on each input port;

releasing from each input port successive first bit blocks of the input data signal, beginning on the time slot assigned to the input port;

converting the successive first bit blocks into successive second bit blocks, wherein the second bit blocks have a larger bit count than the first bit blocks; and writing into an output queue the successive second bit blocks.

28. In a switching fabric for a digital traffic switch, a method for queueing and dequeueing data received, comprising the steps of:

receiving a plurality of input signals on their respective input ports;

assigning to each input port a time slot within a repetitive cycle;

delaying an input data signal for each input port;

releasing, consecutively, from each input port successive first bit blocks of the input data signal, beginning on the time slot assigned to the input port;

converting, consecutively, the successive first bit blocks into successive second bit blocks, wherein the second bit blocks have a larger bit count than the first bit blocks;

writing into an output queue, consecutively, the successive second bit blocks; and reading from the output queue, consecutively, the successive second bit blocks.

29. In a switching fabric for a digital traffic switch, a method for queuing data received, comprising the steps of:

receiving a plurality of input signals on their respective input ports;

assigning to each input port a time slot within a repetitive cycle;

delaying an input data signal for each input port;

releasing, consecutively, from each input port successive first bit blocks of the input data signal, beginning on the time slot assigned to the input port;

converting, concurrently, a plurality of the successive first bit blocks into the plurality of successive second bit blocks, wherein the second bit blocks have a larger bit count than the first bit blocks; and writing into an output queue, concurrently, a plurality of the successive second bit blocks.

* * * * *